UNITED STATES PATENT OFFICE.

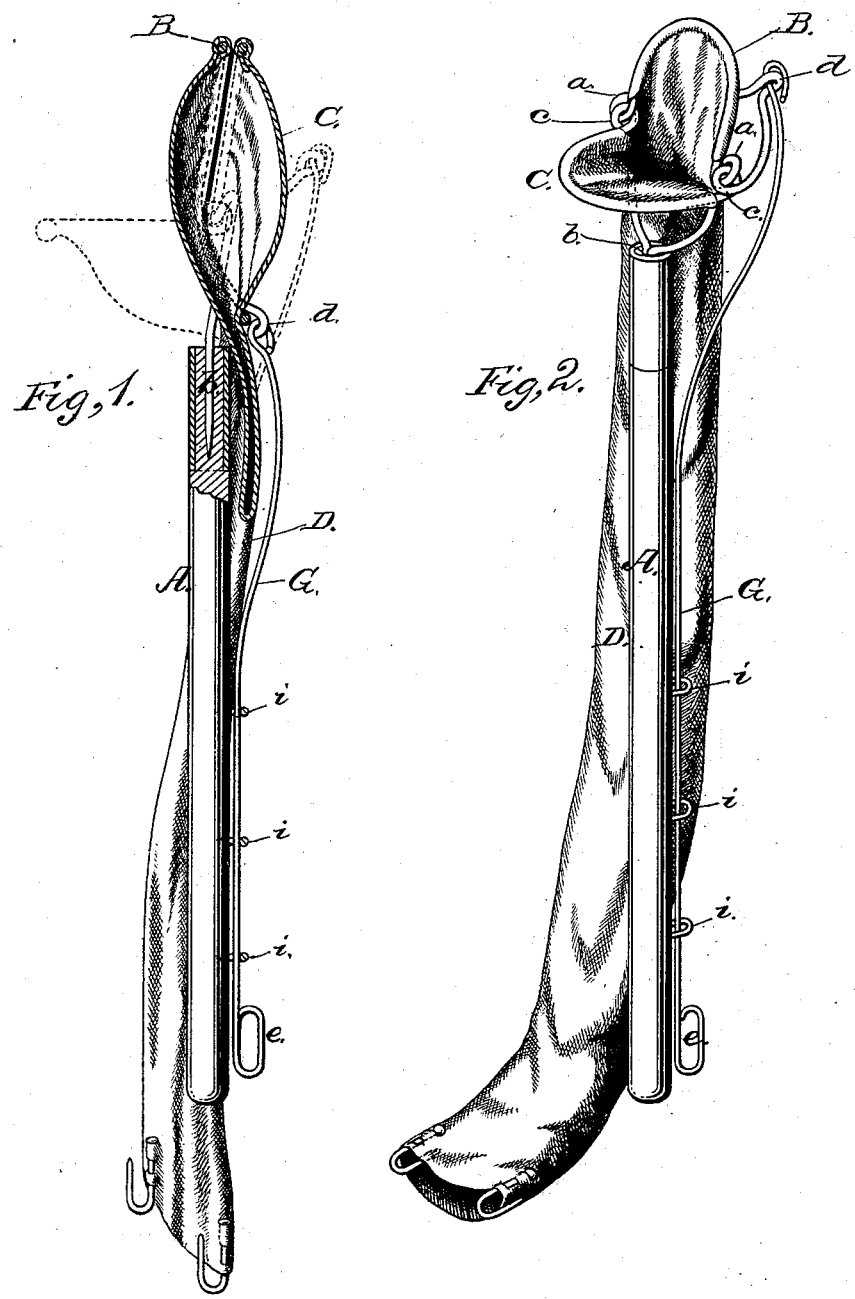

JAMES P. EDDLEMAN, OF WHITESBOROUGH, TEXAS.

FRUIT-GATHERER.

SPECIFICATION forming part of Letters Patent No. 223,720, dated January 20, 1880.

Application filed December 6, 1879.

*To all whom it may concern:*

Be it known that I, JAMES PETER EDDLEMAN, of Whitesborough, in the county of Grayson and State of Texas, have invented a new and valuable Improvement in Fruit-Gatherers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my improved fruit-gatherer, partly in section; and Fig. 2 is a perspective view thereof.

This invention has for its object the improvement of fruit-gatherers designed to be thrust into a tree and cull each fruit separately; and the nature of the invention consists in certain novel combinations of devices, as will be hereinafter more fully set forth.

In the accompanying drawings, the letter A designates a pole or staff carrying at its upper end a fixed oval or elliptical frame, B. This frame is made of stout wire, usually bent to form at each side an eye, a, and having its ends brought together to form a tang, b, by means of which it is attached to the pole. This frame is the fixed jaw of the gatherer.

C indicates a second frame, also made of wire, and of substantially the same form as the frame B. The wire of which this frame is made is bent into a rounded form, its ends passed through the eyes a and looped to form the eyes c, which, being engaged with eyes a, hinge the frame C, which is the movable jaw, to the fixed jaw. An eye, d, is then formed at the lowest point of the frame, and the ends of the wire united in any suitable way, usually by welding or soldering.

It will be observed that the jaws are of substantially the same length, and that when closed upon each other their lower portions are very near together.

D indicates a flexible tube passing upwardly between the lower halves of the jaws B and C, and attached by sewing or otherwise to the upper rounded halves thereof above their hinge-joints. This tube reaches down to the ground and may terminate at a bed of hay, a basket, or other receptacle for the fruit.

G indicates a manipulating-rod flexibly jointed to the eye d of jaw C, and terminating at its lower end in a handle, e. This rod passes through guides i upon the handle and is rigid, in order to insure the opening and closing of the jaws.

In use, the fruit selected is introduced between the jaws and plucked by drawing down upon the rod G, thus closing the said jaws and bringing their lower parts together, or nearly so. This gathers up the flexible tube, which passes between the said lower portions of the jaws, and to all intents and purposes closes it, forming a bag or sack, thus preventing the fruit from passing downward until the jaws are again opened. By this means the delivery of a fruit into a basket or other receptacle is insured before a second one is gathered, thus preventing them from bruising each other.

I am aware that fruit-gatherers having a fixed and a movable jaw, a staff, and a flexible tube are not new; hence I make no broad claim to such devices.

Having described my invention, what I claim as new, and desire to secure by Letters Patent, is—

The combination, with the pole A and the fixed and movable jaw-frames B C, hinged together at the middle of their length, of the flexible tube D, passing between the lower parts of said jaws below their hinge joint, and secured to their upper portions above the same, whereby, as the jaws are closed, the tube is griped and flattened or gathered together, as and for the purpose specified.

In testimony that I claim the above I have hereunto subscribed my name in the presence of two witnesses.

JAMES PETER EDDLEMAN.

Witnesses:
J. F. TOWERS,
J. M. BROOKS.